US006452109B1

(12) United States Patent
Koch et al.

(10) Patent No.: US 6,452,109 B1
(45) Date of Patent: Sep. 17, 2002

(54) BUSHING FOR HIGH ELECTRICAL VOLTAGE

(75) Inventors: Norbert Koch, Köln; Günter Trojan, Troisdorf, both of (DE)

(73) Assignee: Hochspannungsgerate Porz GmbH (DE)

( * ) Notice: Subject to any disclaimer, the term of this patent is extended or adjusted under 35 U.S.C. 154(b) by 0 days.

(21) Appl. No.: 09/623,441

(22) PCT Filed: Feb. 24, 1999

(86) PCT No.: PCT/DE99/00502

§ 371 (c)(1), (2), (4) Date: Apr. 17, 2001

(87) PCT Pub. No.: WO99/45550

PCT Pub. Date: Sep. 10, 1999

(30) Foreign Application Priority Data

Mar. 5, 1998 (DE) ........................................ 198 09 569

(51) Int. Cl.[7] .......................... H01B 17/26; H01G 4/02

(52) U.S. Cl. ............................... 174/152 R; 174/31 R; 174/17 LF; 174/142; 361/313

(58) Field of Search ............................. 361/301.5, 302, 361/313, 314, 315, 511, 512, 529, 530; 174/31 R, 17 LF, 17 GF, 142, 143, 151, 152 R

(56) References Cited

U.S. PATENT DOCUMENTS 2,935,668 A 5/1960 Robinson et al.
3,600,502 A * 8/1971 Wagenaar ................... 174/143
3,627,899 A * 12/1971 Moore ...................... 174/31 R
3,772,578 A * 11/1973 George et al. .............. 361/313
3,806,625 A * 4/1974 Long ........................ 174/31 R
3,970,904 A * 7/1976 Murfitt et al. .............. 361/313
4,283,453 A * 8/1981 Siefried et al. ............. 361/313
4,323,948 A * 4/1982 Mercier et al. ............. 361/315
4,401,841 A * 8/1983 Meyer et al. ............. 174/31 R
4,467,397 A * 8/1984 Thiel et al. ................. 361/313
4,540,848 A * 9/1985 Beijar et al. ............ 174/152 R
5,440,446 A * 8/1995 Shaw et al. .............. 361/301.5
5,748,439 A * 5/1998 MacFarlane et al. ........ 361/512
6,307,735 B1 * 10/2001 Saito et al. ................. 361/512
6,310,760 B1 * 10/2001 Shaw et al. ................. 361/314
6,335,858 B1 * 1/2002 Vasechkin et al. ......... 29/25.03
6,349,028 B1 * 2/2002 Komatsu .................... 361/504

FOREIGN PATENT DOCUMENTS

DE 44 47 571 3/1996
JP 52-64654 5/1977
JP 55-151322 11/1980

OTHER PUBLICATIONS

"Research Disclosure", Sep. 1983, No. 23325, p. 283.

* cited by examiner

*Primary Examiner*—Dean A. Reichard
*Assistant Examiner*—Aldolfo Nino
(74) *Attorney, Agent, or Firm*—Kenyon & Kenyon

(57) ABSTRACT

A bushing for a high electric voltage has a casing through which a central conductor is passed so that it is electrically insulated. Conducting liners spaced a distance apart are arranged concentrically around the central conductor, a combination which functions as a dielectric and is composed of one layer of film and one layer of a nonwoven being provided between the liners. The film and the nonwoven material are each made of plastic, so their water content is very low, and therefore the drying time in manufacturing of the bushing is shortened.

7 Claims, 1 Drawing Sheet

BUSHING FOR HIGH ELECTRICAL VOLTAGE

FIELD OF THE INVENTION

The present invention relates to a bushing for a high electric voltage through a wall of a casing.

BACKGROUND INFORMATION

Bushings for high electric voltages are conventionally used to carry voltage. This makes use of especially good insulation materials. In the case of capacitors, dielectrics which must also have especially good electric insulation properties are used.

U.S. Pat. No. 2,935,668 describes an electric capacitor containing a dielectric formed by a polymer film supported by a fibrous matrix. The fibrous matrix and the polymer film can be fused by controlled application of heat to the dielectric so that the molten polymer of the polymer film readily impregnates the fibrous matrix at the common point of contact.

German Patent Application No. 44 47 571 describes a dielectric of a capacitor in which an oil-impregnated combination of paper and plastic liner is provided between the capacitor faces. Such a dielectric is also known as a hybrid dielectric. Such dielectrics are described in Japanese Patent Applications 52/64654 and 55/151322 and Research Disclosure 23325 of September 1983.

The use of paper in the dielectric of a capacitor has been known for decades, paper being considered to be a reliable material. In the case of using paper in large capacitors or bushings, e.g., in high-voltage capacitors or high-voltage capacitor bushings, there is the problem that paper has a relatively high water content. To eliminate this, water must be removed from the entire arrangement in vacuo and under the influence of heat sometimes over several weeks.

SUMMARY

An object of the present invention is to provide a bushing for a high electric voltage which can be manufactured easily and in a time-saving manner.

This object is achieved according to the present invention by providing a bushing for a high electric voltage having a casing which includes a flange for mounting on an opening, where

- a central conductor is passed through the casing so that it is insulated electrically,
- conducting liners spaced a distance apart are arranged concentrically around the central conductor in the casing,
- a combination composed of at least one layer of film and one layer of a nonwoven material is provided between the liners,
- the combination formed by a layer of film and a layer of nonwoven material is between 20 and 300 μm thick,
- the film and the nonwoven material are each made of plastic, and
- the casing is filled with an insulating material permeating the combination.

The combination may have a low water content because it is made of plastics which usually have a very low water content. This low water content in the combination can be removed especially easily and rapidly because water in plastic materials is bound at the surface. In the case of cellulose fibers, however, the water is bound in the material itself, so that removal of moisture takes place very slowly. The moisture removal time required in manufacturing of the bushing according to the present invention may sometimes be reduced to one tenth of the original time. The combination may also be referred to as a dielectric on the basis of its electric effect.

It is advantageous if polypropylene or polyester, polycarbonate, polyimide, polyvinylidene fluoride (PVDF) or polystyrene is used as the plastic. Thus, the combination has very good electric properties and also has good processability at the same time because of the respective material properties of the plastic.

The insulating material may be, for example, gas or oil. These insulating materials are commonly available, have been tested in practice and therefore allow simple production of the bushing.

The combination of film and nonwoven material may be, for example, 20 to 150 μm thick. This thickness has proven especially advantageous in experiments, so that good electric properties and good processability can be achieved.

The film and the nonwoven material may form a common basic unit in the sense of a sandwich structure. It is thus very simple to manufacture the bushing for a high electric voltage. This basic unit can also be used for a pleated arrangement, e.g., a pleated capacitor. The two layers of the basic unit may also be glued or welded together.

The liners may be made of, for example, aluminum. This yields a design with a low weight and very good processability. Here again, gas or oil is used as the insulating material to advantage.

The conducting liners and the combination may be wound around the central conductor. A wound arrangement formed by the winding of the conducting liners and the combination can be produced especially easily with conventional winding techniques. This wound arrangement has a first and second conducting liner in the winding technique in a casing with one or more films and a nonwoven material made of plastic provided as the dielectric between the liners, and the casing is filled with an insulating material. This wound arrangement is characterized by short throughput and drying times in production and by good electric properties.

The combination according to the present invention is based on materials having a low water content and a high storage volume for an insulating material. By stipulating and selecting the surface roughness of the film, optionally also the surface roughness of the conducting liners, the permeation of the combination by the insulating material can be further optimized.

DETAILED DESCRIPTION

Figure 1:
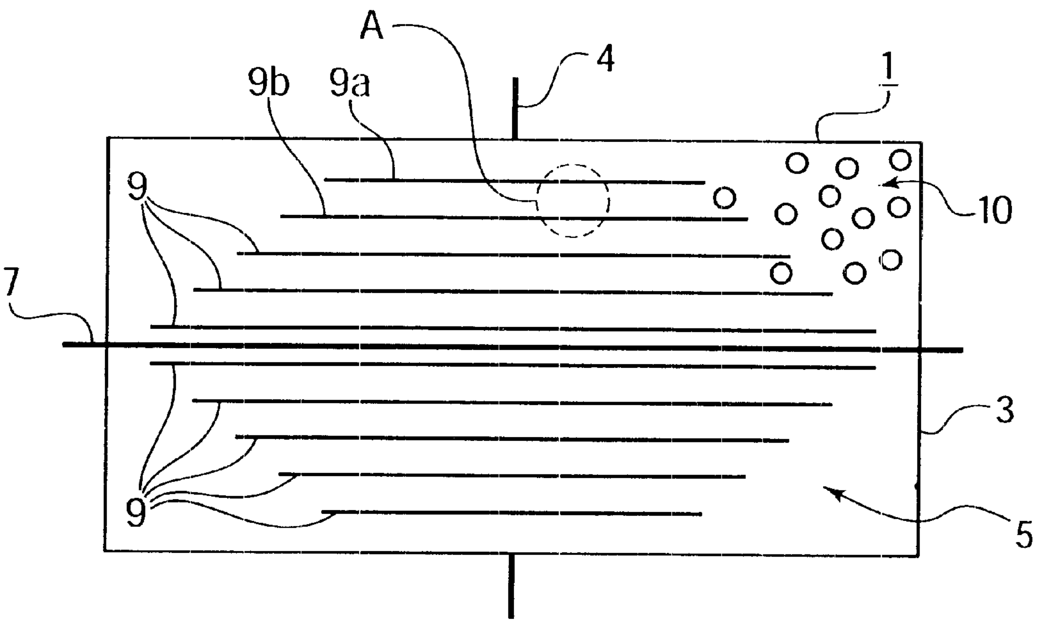
FIG. 1 shows a schematic diagram of a bushing according to the present invention.

FIG. 1 shows in a simplified form a bushing 1 in a sectional diagram along its longitudinal axis. Bushing 1 is designed as a high-voltage bushing in capacitor design and has a casing 3 which can be mounted in an opening of a wall (not shown) by means of a flange 4. Central conductor 7 to which a high electric voltage, e.g., from tens of thousands of volts to several hundred thousand volts, is applied should be passed through the wall without sparkover. Casing 3 is designed in a conventional manner, e.g., with a porcelain body or a body made of a composite material, optionally provided with silicone shields.

For this purpose, in its casing 3, bushing 1 has a capacitor arrangement 5 which is used to control the potential.

Capacitor arrangement 5 is formed by conducting liners 9 arranged concentrically around a central conductor 7 by winding. Bushing 1 is thus almost rotationally symmetrical with regard to the electric field distribution created in it. A combination 11, which is not shown here but is designed as a dielectric in particular, is wound at a distance between liners 9; this is shown in greater detail in FIG. 2 and explained in conjunction with it.

As an insulating material 10, casing 3 may contain in its interior a gas such as $SF_6$, for example, or an oil or some other insulating material suitable for high voltage, also permeating capacitor arrangement 5. In principle, this design of capacitor arrangement 5 can also be used for a high-voltage capacitor, in which case the proper electric terminals would also have to be provided on liners 9.

Figure 2:
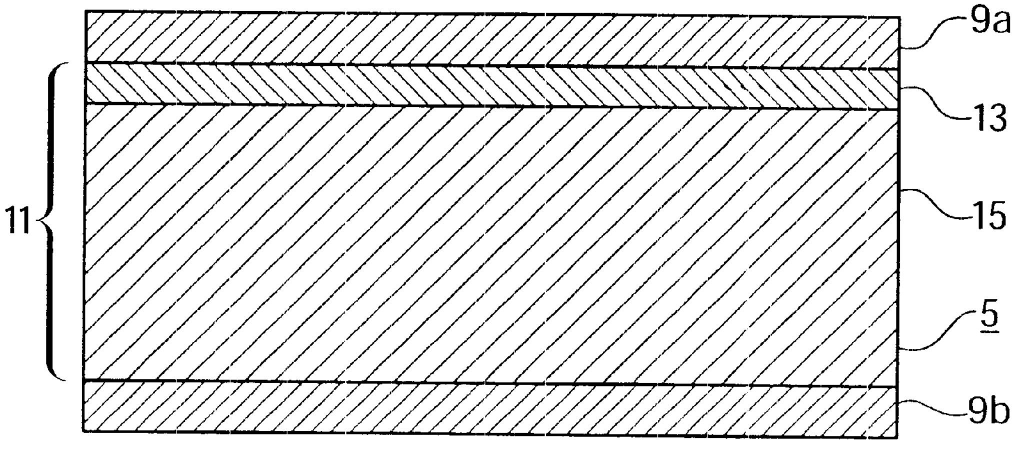
FIG. 2 shows detail A from FIG. 1.

The conducting liners in detail A from FIG. 1, shown in an enlargement in FIG. 2, are described in greater detail below.

FIG. 2 illustrates the basic design of the capacitor arrangement 5 having combination 11 as the dielectric arranged between two liners 9*a*, 9*b* as electrodes 9*a*, 9*b*. Liners 9*a*, 9*b* which function as capacitor faces are made of a conducting material, in particular a metal such as aluminum foil. In some cases, it may also be possible to use a plastic coated with a conducting material, e.g., a graphite-coated or aluminum-coated polypropylene plastic.

Combination 11 includes primarily at least two layers. The first layer is a plastic film 13. The preferred plastic for use is a polypropylene plastic or a polyester plastic. The thickness is approximately 5 to 20 μm. For example, thicknesses of 6, 12 and 18 μm have been tested in experiments.

The second layer is a nonwoven material 15 made of plastic. This has the function of producing a total thickness of combination 11 and also functions as a holding space or permeation medium (e.g., in the sense of a wick) for the it insulating material, e.g., gas, in particular $SF_6$, or oil. It therefore has a certain porosity. It may also be formed by fibers, for example.

The total thickness of combination 11 should be less than 300 μm, in which case the thickness of nonwoven material 15 is such that it is the equalizer between the total thickness and the thickness of film 13. A nonwoven material with a thickness of 80 μm, for example, was used successfully in a special experiment.

The total thickness of combination 11 is selected so that its insulation capacity corresponds at least to that of a comparable oil-impregnated paper layer according to the related art. The total thickness may of course also be less than that in the related art.

Capacitor arrangement 5 shown here may be designed as a wound arrangement. However, other processing methods such as pleating or pressing a wound arrangement are also possible. Capacitor arrangement 5 may also be used to form a high-voltage capacitor. The preferred application of the details according to the present invention is in gas- or oil-filled capacitors or bushings in high-voltage technology.

What is claimed is:

1. A bushing for a high electric voltage, comprising:

a casing including a flange for mounting on an opening;

a central conductor passed through the casing with electric insulation;

separate conducting liners spaced a distance apart and arranged concentrically around the central conductor in the casing;

a combination composed of at least one layer of film and one layer of a nonwoven material provided between the liners, the combination having a thickness of between 20 and 300 μm, the film and the nonwoven material each being made of plastic; and an insulating material filling the casing and permeating the combination.

2. The bushing according to claim 1, wherein the film and the nonwoven material are made from one of polypropylene and polyester.

3. The bushing according to claim 2, wherein the liners and the combination are each wound around the central conductor.

4. The bushing according to claim 1, wherein the insulating material is one of gas and oil.

5. The bushing according to claim 1, wherein the combination has a thickness of between 20 and 150 μm.

6. The bushing according to claim 1, wherein the film and the nonwoven material form a common component as a sandwich structure.

7. The bushing according to claim 1, wherein the liners are made of aluminum.

* * * * *